(12) United States Patent
Lai et al.

(10) Patent No.: US 9,046,641 B2
(45) Date of Patent: Jun. 2, 2015

(54) SILICONE HYDROGEL COMPOSITION AND SILICONE HYDROGEL CONTACT LENSES MADE FROM THE COMPOSITION

(71) Applicant: Pegavision Corporation, Guishan Township, Taoyuan County (TW)

(72) Inventors: Yu-Chin Lai, Guishan Township, Taoyuan County (TW); Min-Tzung Yeh, Guishan Township, Taoyuan County (TW); Heng-Yi Li, Guishan Township, Taoyuan County (TW); Wei-Jia Ting, Guishan Township, Taoyuan County (TW)

(73) Assignee: PEGAVISION CORPORATION, Guishan Township, Taoyuan County (TW)

( * ) Notice: Subject to any disclaimer, the term of this patent is extended or adjusted under 35 U.S.C. 154(b) by 10 days.

(21) Appl. No.: 13/870,792

(22) Filed: Apr. 25, 2013

(65) Prior Publication Data

US 2014/0155515 A1 Jun. 5, 2014

(30) Foreign Application Priority Data

Nov. 30, 2012 (TW) .............................. 101145076 A

(51) Int. Cl.

| C08F 226/10 | (2006.01) |
|---|---|
| C08F 230/08 | (2006.01) |
| C08F 222/20 | (2006.01) |
| C08L 101/14 | (2006.01) |
| C08L 83/04 | (2006.01) |
| C08L 83/08 | (2006.01) |
| C08G 77/388 | (2006.01) |
| G02B 1/04 | (2006.01) |
| C08F 290/06 | (2006.01) |
| C08G 18/61 | (2006.01) |
| C08G 18/81 | (2006.01) |

(52) U.S. Cl.
CPC .............. *G02B 1/043* (2013.01); *C08G 77/388* (2013.01); *C08L 83/08* (2013.01); *C08F 226/10* (2013.01); *C08F 230/08* (2013.01); *C08G 18/61* (2013.01); *C08G 18/8116* (2013.01)

(58) Field of Classification Search
None
See application file for complete search history.

(56) References Cited

U.S. PATENT DOCUMENTS

| 4,139,513 | A | | 2/1979 | Tanaka et al. | |
|---|---|---|---|---|---|
| 4,139,692 | A | | 2/1979 | Tanaka et al. | |
| 4,235,985 | A | * | 11/1980 | Tanaka et al. | 526/279 |
| 5,034,461 | A | | 7/1991 | Lai et al. | 525/100 |
| 5,760,100 | A | * | 6/1998 | Nicolson et al. | 523/106 |
| 5,776,999 | A | | 7/1998 | Nicolson et al. | |
| 5,998,498 | A | | 12/1999 | Vanderlaan et al. | |
| 6,087,415 | A | * | 7/2000 | Vanderlaan et al. | 523/105 |
| 6,367,929 | B1 | * | 4/2002 | Maiden et al. | 351/159.33 |
| 6,500,481 | B1 | * | 12/2002 | Vanderlaan et al. | 427/2.24 |
| 6,534,559 | B1 | * | 3/2003 | Vanderlaan et al. | 523/105 |
| 6,822,016 | B2 | * | 11/2004 | McCabe et al. | 523/107 |
| 6,838,491 | B1 | * | 1/2005 | Vanderlaan et al. | 523/107 |
| 6,943,203 | B2 | | 9/2005 | Vanderlaan et al. | |
| 7,052,131 | B2 | * | 5/2006 | McCabe et al. | 351/159.33 |
| 7,214,809 | B2 | * | 5/2007 | Zanini et al. | 556/419 |
| 7,247,692 | B2 | * | 7/2007 | Laredo | 526/279 |
| 7,249,848 | B2 | * | 7/2007 | Laredo et al. | 351/159.33 |
| 7,396,890 | B2 | * | 7/2008 | Zanini et al. | 526/279 |
| 7,649,058 | B2 | * | 1/2010 | McCabe et al. | 525/474 |
| 7,666,921 | B2 | * | 2/2010 | McCabe et al. | 523/107 |
| 7,691,916 | B2 | * | 4/2010 | McCabe et al. | 522/99 |
| 8,168,720 | B2 | | 5/2012 | McCabe et al. | |
| 8,622,543 | B2 | * | 1/2014 | Phelan | 351/159.32 |
| 2003/0125498 | A1 | * | 7/2003 | McCabe et al. | 528/25 |
| 2003/0162862 | A1 | * | 8/2003 | McCabe et al. | 523/106 |
| 2004/0246436 | A1 | | 12/2004 | Turek et al. | |
| 2006/0063852 | A1 | | 3/2006 | Iwata et al. | |
| 2012/0252925 | A1 | | 10/2012 | Iwata et al. | |

FOREIGN PATENT DOCUMENTS

| WO | 2011041523 A2 | 4/2011 |
|---|---|---|
| WO | 2012013947 | 2/2012 |

OTHER PUBLICATIONS

Synthesis and characterization of new UV absorbing microspheres . . . ; Goldshtein et al.; Jun. 6, 2009; Polymer; 50 (2009); p. 3422-3430.*

* cited by examiner

*Primary Examiner* — James J Seidleck
*Assistant Examiner* — Peter A Salamon
(74) *Attorney, Agent, or Firm* — Michael A. Glenn; Perkins Coie LLP

(57) ABSTRACT

A silicone hydrogel composition is disclosed. The composition includes at least one silicone macromer, a hydroxy-functionalized silicone-containing monomer, a first hydrophibic monomer and at least one crosslinker, in which the first hydrophibic monomer is N-vinyl pyrrolidone. The silicone macromer and the hydroxy-functionalized silicone-containing monomer are mutually soluble with N-vinylpyrrolidone. Silicone hydrogel contact lenses prepared from the silicone hydrogel composition are also disclosed.

18 Claims, 2 Drawing Sheets

SILICONE HYDROGEL COMPOSITION AND SILICONE HYDROGEL CONTACT LENSES MADE FROM THE COMPOSITION

RELATED APPLICATIONS

This application claims priority to Taiwan Application Serial Number 101145076, filed Nov. 30, 2012, which is herein incorporated by reference.

BACKGROUND

1. Field of Invention

The present invention relates to a material for contact lenses. More particularly, the present invention relates to a silicone hydrogel composition for contact lenses.

2. Description of Related Art

Since contact lenses made from silicone hydrogel have high oxygen permeability, and allows sufficient oxygen directly through the lenses to the cornea, thereby providing sufficient oxygen to the cornea. As such, the silicone hydrogel contact lenses may less likely result in corneal hypoxia from lack of oxygen even after a prolonged wearing of contact lenses. In this regard, silicone hydrogel has become one of the preferable components for making contact lenses.

Silicone hydrogel lenses are typically made from one or two kinds of silicone monomer, macromer or prepolymer, and these silicone components are hydrophobic, so the lens surface is apt to becoming dry due to the lack of water, making eyes feel uncomfortable. There are methods for improving the wettability of a silicone hydrogel lens, such as 1) performing a plasma process on the surface of the silicone-containing hydrophobic lens, which are described in the U.S. Pat. Nos. 6,367,929, 6,822,016, 7,052,131, 7,649,058, 7,666,921, 7,691,916 and 8,168,720. 2) Hydrophilic polymers, such as polyvinylpyrrolidone (PVP), were added to a silicone hydrogel formulation. Further, U.S. publication no. 2006/0063852 disclosed using a silicone-based prepolymer having polyethylene oxide side chains. However, the above methods may make the manufacturing process more difficult and increase the production cost of the silicone hydrogel contact lenses. In addition, silicone hydrogel absorbs lipids easily, so lipids are deposited on the lens surface causing blurred vision.

Therefore, how to polymerize a lens forming composition containing a hydrophilic monomer and a silicone monomer, macromer or prepolymer to obtain a contact lens with high transparency, high oxygen permeability and high moisturizing capability is still an issue to be addressed in the art.

SUMMARY

In view of the foregoing problems with the prior art, a novel silicone hydrogel composition with high transparency, high oxygen permeability and high moisturizing capability is disclosed in the present invention.

One aspect of the present disclosure provides a silicone hydrogel composition comprises at least one silicone macromer, a hydroxy-functionalized silicone-containing monomer, a first hydrophilic monomer and at least one crosslinker, in which the first hydrophilic monomer is N-vinyl pyrrolidone. The silicone macromer, the hydroxy-functionalized silicone-containing monomer or a combination thereof is mutually soluble with N-vinylpyrrolidone.

In the present invention, the amount of the silicone macromer is in the range of 5 to 50 weight percentage (wt %) based on the total weight of the composition, and the silicone macromer has a structure of chemical formula (1):

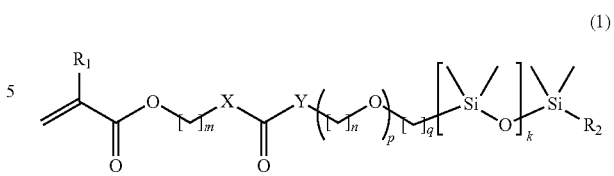

wherein X and Y are a secondary amino group (—NH—) or an oxygen atom, and at least one of them is a secondary amino group (—NH—). $R_1$ is a hydrogen atom or a methyl group, $R_2$ is a C1-C12 alkyl group, m and n are independently an integer from 2 to 4, p is an integer from 0 to 4, q is an integer from 2 to 4, k is an integer which makes the number average molecular weight ($M_n$) of the silicone macromer in the range of 600 to 3000, and the molar ratio of silicone to nitrogen of the silicone macromer is in a range from 20:1 to 5:1.

The amount of the hydroxy-functionalized silicone-containing monomer is in the range of 5 to 50 wt % based on the total weight of the composition, the hydroxy-functionalized silicone-containing monomer has a structure of chemical formula (2):

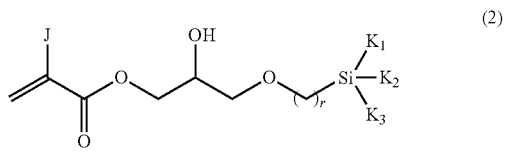

wherein J is a hydrogen atom or a methyl group, r is an integer from 2 to 10, $K_1$, $K_2$ and $K_3$ are each a methyl group or a trimethylsiloxy (—OSi(CH$_3$)$_3$), and at least one $K_1$, $K_2$ and $K_3$ is a methyl group or a trimethylsiloxy (—OSi(CH$_3$)$_3$).

The amount of the first hydrophilic monomer is in the range of 30 to 60 wt % based on the total weight of the composition, and the amount of the crosslinker is less than 20 wt % based on the total weight of the composition.

According to one embodiment of the present invention, when X is a secondary amino group (—NH—), Y is a secondary amino group (—NH—), m is 2, p is 0, and q is 3 in the structure of chemical formula (1), the silicone macromer has a structure of chemical formula (3):

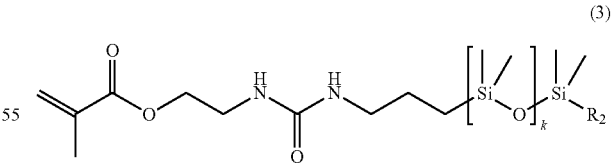

wherein k is an integer which makes the number average molecular weight ($M_n$) of the silicone macromer in the range of 600 to 3000, and R2 is a C1-C10 alkyl group.

According to another embodiment of the present invention, when X is a secondary amino group (—NH—), Y is an oxygen atom, m is 2, n is 2, q is 3 in the structure of chemical formula (1), the silicone macromer has a structure of chemical formula (4):

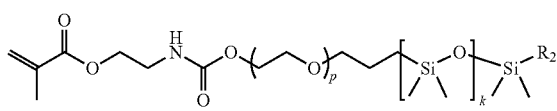

(4)

wherein k is an integer which makes the number average molecular weight ($M_n$) of the silicone macromer in the range of 600 to 3000, p is an integer from 0 to 4, and R2 is a C1-C10 alkyl group.

According to yet another embodiment of the present invention, the molar ratio of silicon to nitrogen of the silicone macromer is in a range from 20:1 to 5:1. The silicone macromer contains urethane, urea or a combination thereof.

According to one embodiment of the present invention, when J is a methyl group, r is 3, $K_1$ is a methyl group, $K_2$ and $K_3$ are trimethylsiloxy in the structure of chemical formula (2), the hydroxy-functionalized silicone-containing monomer is (3-methacryloxy-2-hydroxypropoxy)propylbis(trimethylsiloxy)methylsilane, the hydroxy-functionalized silicone-containing monomer has a structure of chemical formula (5):

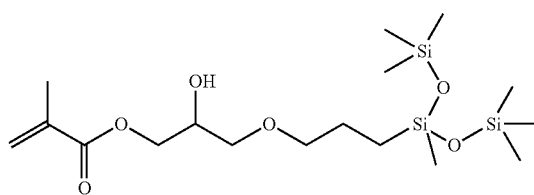

(5)

According to another embodiment of the present invention, the molecular weight of the hydroxy-functionalized silicone-containing monomer is less than 500, and the molar ratio of silicon to the hydroxyl group of the hydroxy-functionalized silicone-containing monomer is in a range from 2:1 to 4:1.

According to yet another embodiment of the present invention, the crosslinker is selected from the group comprising ethylene glycol di(meth)acrylate, triethylene glycol di(meth)acrylate, tetramethylene glycol di(meth)acrylate, trimethylolpropane tri(meth)acrylate, pentaerythritol tetra(meth)acrylate, bisphenol A di(meth)acrylate, methylenebis(meth)acrylamide, divinyl ether, divinyl sulfone, divinylbenzene, trivinylbenzene, triallyl isocyanurate, triallyl phthalate and diallyl phthalate, allyl methacrylate, and a combination thereof.

According to one embodiment of the present invention, further comprising at least one second hydrophilic monomer, and the amount of the second hydrophilic monomer is less than 20 wt % based on the total weight of the composition, wherein the second hydrophilic monomer is selected from the group consisting of 2-hydroxyethyl methacrylate, glycerol methacrylate, 2-hydroxy-butyl methacrylate, acrylic acid, methacrylic acid, N,N-dimethylacrylamide, N,N-dimethyl methacrylamide, N-vinyl,N-methyl acetamide, 2-methacryloyloxyethyl phosphorylcholine, and a combination thereof.

According to another embodiment of the present invention, further comprising at least one tint monomer or one tint compound, and the tint monomer is a blue-tint monomer.

According to another embodiment of the present invention, further comprising at least one UV-blocking monomer, and the UV-blocking monomer is a benzotriazole-type monomer.

According to another embodiment of the present invention, further comprising at least one organic solvent, wherein the organic solvent is selected from the group comprising n-butanol, t-butanol, n-pentyl alcohol, t-amyl alcohol, n-hexanol, n-octanol, n-nonanol, n-decanol, 3-methoxy-1-butanol, methyl cabitol, ethyl carbitol, propyl carbitol, butyl carbitol and a combination thereof.

According to yet another embodiment of the present invention, the total to amount of the silicone macromer and the hydroxy-functionalized silicone-containing monomer is in the range of 40 to 70 wt % based on the total weight of the composition.

According to yet another embodiment of the present invention, the amount of the silicone macromer is in the range of 10 to 30 wt % based on the total weight of the composition, the amount of the hydroxy-functionalized silicone-containing monomer is in the range of 10 to 30 wt % based on the total weight of the composition, and the amount of N-vinyl pyrrolidone is in the range of 30 to 50 wt % based on the total weight of the composition.

Another aspect of the present disclosure provides silicone hydrogel contact lenses, comprising a lens body and the lens body is prepared from the above-mentioned silicone hydrogel composition.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
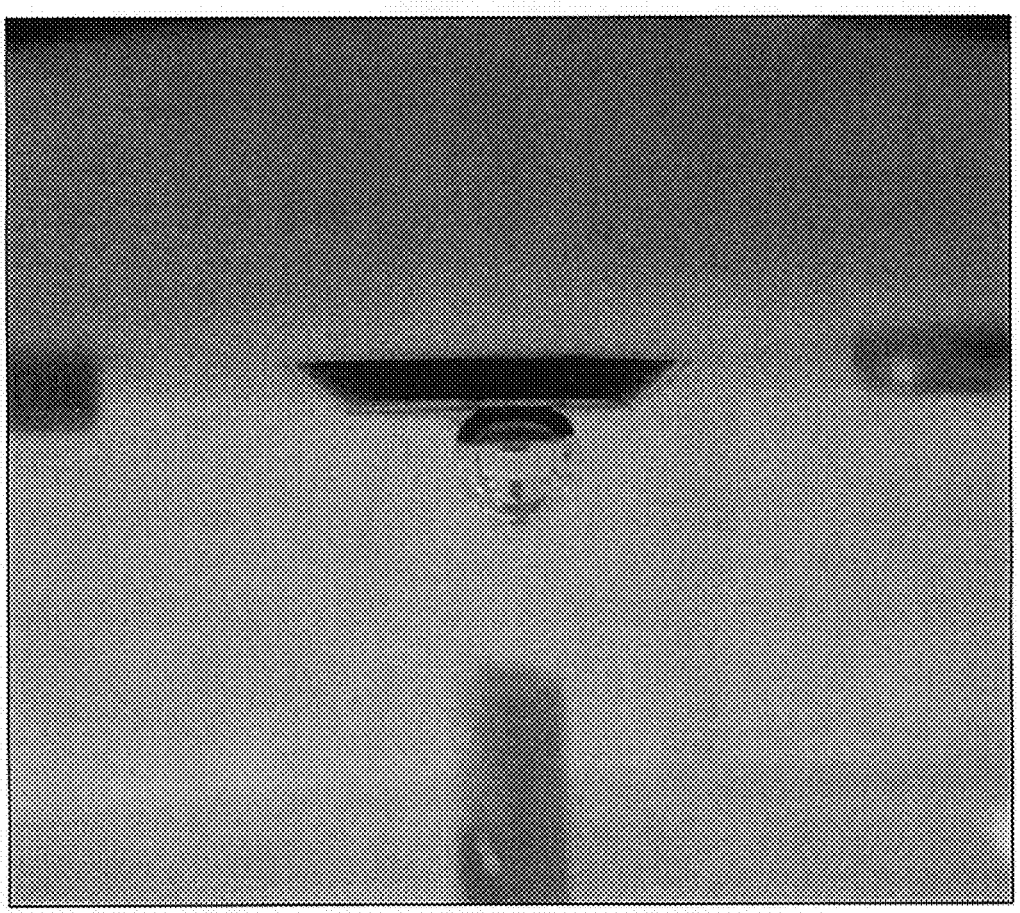
FIG. 1A is a digital image for contact angle measurement of silicone hydrogel contact lenses according to one embodiment of this disclosure.

Reference will now be made in detail to the present embodiments of the invention, examples of which are illustrated in the accompanying drawings. Wherever possible, the same reference numbers are used in the drawings and the description to refer to the same or like parts.

A Silicone Hydrogel Composition

A silicone hydrogel composition comprises at least one silicone macromer, a hydroxy-functionalized silicone-containing monomer, a first hydrophilic monomer and at least one crosslinker, in which the first hydrophilic monomer is N-vinyl pyrrolidone. The silicone macromer, the hydroxy-functionalized silicone-containing monomer or a combination thereof is mutually soluble with N-vinylpyrrolidone, and the silicone hydrogel composition according to embodiments of the present invention has higher polarity because of N-vinylpyrrolidone having extremely high hydrophilicity. Compare to the conventional silicone macromer and prepolymer with lower polarity, the silicone macromer and the hydroxy-functionalized silicone-containing monomer are relatively hydrophilic, such that the silicone hydrogel contact lenses made from the silicone macromer, the hydroxy-functionalized silicone-containing monomer and N-vinylpyrrolidone have extremely high hydrophilicity which can be highly moisturized, and the surface of the contact lenses are less likely to lose water compared to other silicone hydrogels without the combination of these classes of silicone macromer and silicone monomers.

The silicone monomer according to the embodiments of the present invention means a polymerizable silicone compound having a single molecular weight of less than 600. The silicone macromer refers to a mixture of high molecular weight monomer with an average molecular weight over 600, wherein each molecule has a polymerizable double bond and at least two continuous units of dimethylsiloxane. The difference between the silicone prepolymer and the silicone macromer is that the silicone prepolymer has at least two polymerizable double bonds.

The amount of the silicone macromer is in the range of 5 to 50 wt % based on the total weight of the composition, and the silicone macromer has a structure of chemical formula (1):

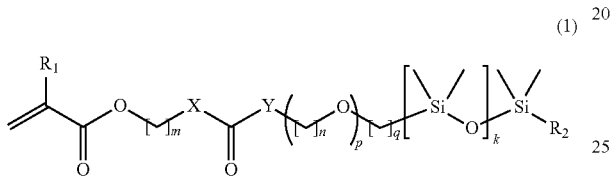

(1)

wherein X and Y are independently a secondary amino group (—NH—) or an oxygen atom, at least one of them is a secondary amino group (—NH—), $R_1$ is a hydrogen atom or a methyl group, $R_2$ is a C1-C12 alkyl group, m and n are independently an integer from 2 to 4, p is an integer from 0 to 4, q is an integer from 2 to 4, k is an integer which makes the number average molecular weight ($M_n$) of the silicone macromer in the range of 600 to 3000, and the molar ratio of silicon to nitrogen of the silicone macromer is in a range from 20:1 to 5:1.

In one embodiment, when X is a secondary amino group (—NH—), Y is a secondary amino group (—NH—), m is 2, p is 0, and q is 3 in the structure of chemical formula (1), the silicone macromer has a structure of chemical formula (3):

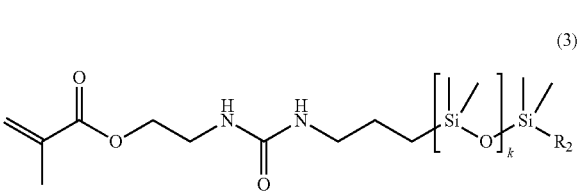

(3)

wherein k is an integer which makes the number average molecular weight ($M_n$) of the silicone macromer in the range of 600 to 3000, and R2 is a C1-C10 alkyl group.

In another embodiment, when X is a secondary amino group (—NH—), Y is an oxygen atom, m is 2, n is 2, q is 3 in the structure of chemical formula (1), the silicone macromer has a structure of chemical formula (4):

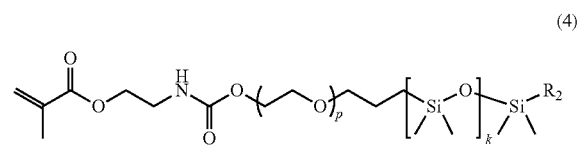

(4)

wherein k is an integer makes the number average molecular weight ($M_n$) of the silicone macromer in the range of 600 to 3000, p is an integer from 0 to 4, and $R_2$ is a C1-C10 alkyl group.

In one embodiment, the molecular weight of the silicone macromer is in the range of 600 to 3000, and the molar ratio of silicon to nitrogen of the silicone macromer is in a range from 20:1 to 5:1. In another embodiment, the molar ratio of silicon to nitrogen of the silicone macromer is in a range from 10:1 to 5:1. In yet another embodiment, the silicone macromer contains urethane, urea or a combination thereof.

The amount of the hydroxy-functionalized silicone-containing monomer is in the range of 5 to 50 wt % based on the total weight of the composition, the hydroxy-functionalized silicone-containing monomer has a structure of chemical formula (2):

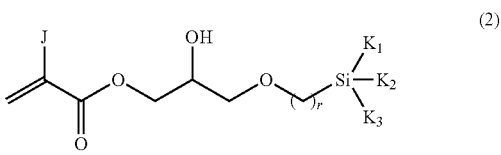

(2)

wherein J is a hydrogen atom or a methyl group, r is an integer from 2 to 10, $K_1$, $K_2$ and $K_3$ are each a methyl group or a trimethylsiloxy (—OSi(CH$_3$)$_3$), and at least one $K_1$, $K_2$ and $K_3$ is a methyl group or trimethylsiloxy (—OSi(CH$_3$)$_3$)

In one embodiment, when J is a methyl group, r is 3, $K_1$ is a methyl group, $K_2$ and $K_3$ are trimethylsiloxy in the structure of chemical formula (2), the hydroxy-functionalized silicone-containing monomer is (3-methacryloxy-2-hydroxypropoxy)propylbis(trimethylsiloxy)methylsilane, the hydroxy-functionalized silicone-containing monomer has a structure of chemical formula (5):

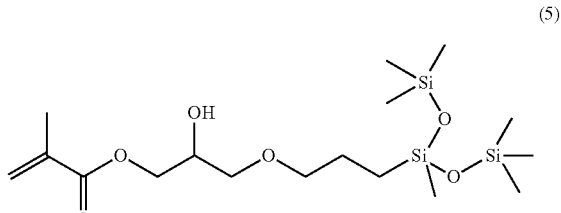

(5)

In another embodiment, the molecular weight of the hydroxy-functionalized silicone-containing monomer is less than 500, and the molar ratio of silicon to the hydroxyl group of the hydroxy-functionalized silicone-containing monomer is in a range from 2:1 to 4:1.

The amount of the crosslinker is less than 20 wt % based on the total weight of the composition. In one embodiment, the crosslinker is selected from the group comprising ethylene glycol di(meth)acrylate, triethylene glycol di(meth)acrylate, tetramethylene glycol di(meth)acrylate, trimethylolpropane tri(meth)acrylate, pentaerythritol tetra(meth)acrylate, bisphenol A di(meth)acrylate, methylenebis(meth)acrylamide, divinyl ether, divinyl sulfone, divinylbenzene, trivinylbenzene, triallyl isocyanurate, triallyl phthalate and diallyl phthalate, allyl methacrylate, and a combination thereof.

The silicone hydrogel composition further comprises at least one second hydrophibic monomer, and the amount of the second hydrophibic monomer is less than 20 wt % based on the total weight of the composition, wherein the second hydrophilic monomer is selected from the group consisting of 2-hydroxyethyl methacrylate, glycerol methacrylate, 2-hydroxy-butyl methacrylate, acrylic acid, methacrylic acid, N,N-dimethylacrylamide, N,N-dimethyl methacrylamide, N-vinyl,N-methyl acetamide, 2-methacryloyloxyethyl phosphorylcholine, and the combinations thereof.

The silicone hydrogel composition further comprises at least one tint monomer or one tint compound. In one embodiment, the tint monomer is blue-tint monomers.

The silicone hydrogel composition further comprises at least one UV-blocking monomer. In one embodiment, the UV-blocking monomer is a benzotriazole-type monomer.

In the embodiments of the present invention, the silicone macromer and the hydroxy-functionalized silicone-containing monomer are mutually soluble with N-vinylpyrrolidone. So without adding any other solvent to the silicone hydrogel composition, transparent contact lenses can be made after the silicone hydrogel composition is polymerized. This feature allows more flexibility in the process of making a contact lens from a silicone hydrogel composition, such as the capability of dry release of a lens from plastic molds. Dry lenses very often offer flexibility in processing a contact lens into its final form the above-mentioned properties are not known to all commercially silicone hydrogel lenses.

If necessary, the silicone hydrogel composition in embodiments of the present invention contains at least one organic solvent. In one embodiment, the organic solvent is selected from the group comprising n-butanol, t-butanol, n-pentyl alcohol, t-amyl alcohol, n-hexanol, n-octanol, n-nonanol, n-decanol, 3-methoxy-1-butanol, methyl cabitol, ethyl carbitol, propyl carbitol, butyl carbitol and a combination thereof.

In another embodiment, the amount of the silicone macromer is in the range of 10 to 30 wt % based on the total weight of the composition, the amount of the hydroxy-functionalized silicone-containing monomer is in the range of 10 to 30 to wt % based on the total weight of the composition, and the amount of N-vinyl pyrrolidone is in the range of 30 to 50 wt % based on the total weight of the composition.

The above silicone hydrogel composition can be applied in the biomedical field, in particular, being a main component of the silicone hydrogel contact lenses, but is not limited thereto.

Silicone Hydrogel Contact Lenses

Silicone hydrogel contact lenses comprise a lens body prepared from the above silicone hydrogel composition.

According to an embodiment of the present invention, the method for preparing the above silicone hydrogel contact lenses is as the following steps: First a silicone hydrogel composition was injected into plastic molds, and the silicone hydrogel composition was cured in the molds to form a lens body; then the lens body was released from the molds, and soaked in the water for hydrating the lens body; the lens body was placed in a package containing packaging solution, and the sealed package was sterilized.

For example, the molds for preparing the contact lens was made from a thermoplastic polymer, for example, polypropylene; the construction of the mold was composed of a female mold and a male mold, and the female mold was filled with enough amount of the silicone hydrogel composition for forming a lens body. The male mold was coupled to the female mold for forming a cavity of lens shape, and the material of the lens body was located in the cavity.

According to an embodiment of the present invention, the silicone hydrogel composition in the lens molds can be cured by any suitable method, for example, UV curing or thermal curing. The method of UV curing comprises the following steps; first a silicone hydrogel composition of 65 microliter is injected to a female mold, where the silicone hydrogel composition contains a silicone macromer, a hydroxy-functionalized silicone-containing monomer, N-vinyl pyrrolidone, blue-tint monomers, a photo initiator and an organic solvent. Afterwards, a male mold was disposed on the female mold, and the lens molds were placed under UV light for about 10 to 15 minutes for curing the silicone hydrogel composition to form a polymerized lens body. The above photo initiator can be benzoin methyl ether, 1-Hydroxy cyclohexyl phenyl ketone, Darocur-1173 or Igracure-819.

According to an embodiment of the present invention, the thermal curing method comprises the following steps. a mold filled with a silicone hydrogel composition is placed in an oven, and the oven is sealed; air is extracted from the oven for about 30 minutes, and nitrogen is filling into the oven until a slight positive pressure reached; in a first stage the oven is heated up to 55° C. and maintained about 60 minutes; in a second stage the oven up to 70° C. and maintained about 30 minutes; in a third stage the oven is heated up 90° C. and maintained about 30 minutes; and then in a fourth stage the oven is heated up to 110° C. and maintained about 30 minutes. The above silicone hydrogel contains a thermal initiator, and the initiator can be 2,2'-azo-bis(2,4-dimethylvaleronitrile), 2,2'-azo-bis(2-methylpropionitrile) or 1,1'-azo-bis(cyanocyclohexane).

After curing treatment, the male mold is removed, and the lens is released from the mold. The method for lens demolding can be a wet-demolding method or a dry-demolding method. In one embodiment, the polymerizable lens body is extracted by isopropanol for about four hours, and the lens body is then soaked in an isopropanol/water (50/50 v/v) for about one hour and then soaked in deionized water. After that, the appearance of lens body can be detected.

After detecting, the lens body was placed in a package filled with packaging solution. Then after sealing the package, the package was autoclaved for 30 minutes. The above packaging solution was a buffered saline solution having a pH value between 7.0 and 7.4, for example, borate buffered saline or phosphate buffered saline. After sterilization, the silicone hydrogel contact lens as used herein referred to an ophthalmic lens. The measurements of key lens properties can be carried out at this time, including the equilibrium water content, tensile modulus, coefficient of friction, oxygen permeability and contact angle.

EXAMPLES

The following examples are provided to illustrate certain aspects of the present disclosure and to aid those of skill in the art in practicing this disclosure. These examples are in no way to be considered to limit the scope of the disclosure in any manner.

Preparing the Silicone Macromer of Chemical Formula (3)

300 g monoaminopropyl-terminated polydimethylsiloxane (number average molecular weight (Mn) is 900), 250 ml dichloromethane and 1.2 mg dibutyltin dilaurate were putted into a 1-L-3-necked round bottom flask equipped with a reflux condenser and a nitrogen blanket; then 111.71 g methacryloyloxyethyl isocyanate (at least 1.5 fold relative to polydimethylsiloxane) was slowly added to the solution, and the reaction time at this step was more than 30 minutes, then the mixture was stirred for about four hours at room temperature; 28.8 g methanol was slowly added to the mixture for more than 20 minutes of reaction time, thereby stirred for 2 hours; dichloromethane was removed under a reduced pressure, and the crude product was extracted and dried for obtaining 310 g silicone macromere. The yield was 85%, and the mean average molecular (Mn) was 1220. The polydispersity was 1.23 (by size exclusion chromatography, using polystyrene as standard). Finally the structure was confirmed by nuclear magnetic resonance (NMR).

Preparing the Silicone Macromer of Chemical Formula (4)

The preparing method for the silicone macromer of chemical formula (4) is like as the above preparing method of chemical formula (3). The only difference is that monoaminopropyl-terminated polydimethylsiloxane was replaced by carbinol-terminated polydimethylsiloxane (Mn 950). 310 g silicone macromere was obtained, the production was 89%, the number average molecular weight (Mn) was 1277, the polydispersity was 1.21, and the structure was confirmed by nuclear magnetic resonance (NMR).

Solubility Analysis: Examples A1 to A4

N-vinyl pyrrolidone was mixed with a silicone macromer, a hydroxy-functionalized silicone-containing monomer or a combination thereof with different weigh ratios ranging from around 0.03 to 10 in a container, and the level of transparency of the mixture was observed after shaking them well. The mixed solution was more clear when the mutual solubility between N-vinyl pyrrolidone and the silicone containing species was higher. In comparative example A, NVP was mixed with a silicone macromer which does not have nitrogen element, the average molecule weight of this silicone macromer was similar to the silicone macromer of chemical formula (3) and chemical formula (4), at approximately 1100. In example A1, NVP was mixed with the silicone macromer of chemical formula (3). In example A2, NVP was mixed with the silicone macromer of chemical formula (4). In example A3, NVP was mixed with the silicone macromer of chemical formula (3) and the hydroxy-functionalized silicone-containing monomer of chemical formula (5), and the molar ratio of the hydroxy-functionalized silicone-containing monomer of chemical formula (5) to the silicone macromer of chemical formula (3) was 3:1. In example A4, NVP was mixed with the silicone macromer of chemical formula (3) and the hydroxy-functionalized silicone-containing monomer of chemical formula (5), and the molar ratio of the hydroxy-functionalized silicone-containing monomer of chemical formula (5) to the silicone macromer of chemical formula (3) was 1:1 . The results of the solubility analysis were shown in Table 1:

TABLE 1

| | Weight ratio of NVP/ silicone species | Transparency |
|---|---|---|
| Comparative Example A | 0.04-0.70 0.70-9.61 | Clear Cloudy |
| Example A1 | 0.03-9.99 | Clear |
| Example A2 | 0.03-9.99 | Clear |
| Example A3 | 0.09-9.80 | Clear |
| Example A4 | 0.09-9.83 | Clear |

When the mixing ratio of N-vinyl pyrrolidone with the silicone macromer without comprising a nitrogen element in its composition was higher than 0.7, the mixed solution was cloudy. This is because N-vinyl pyrrolidone is very polar, and the silicone macromer without nitrogen element is nonpolar. So N-vinyl pyrrolidone has a very limited solubility in this macromer and vice versa. NVP is not soluble in this silicone macromer when their weight ratio in the mixture was over 0.7 or higher. The silicone macromer in the present invention contains nitrogen element (in urethane and urea linkages), so it has higher polarity over than the macromer without nitrogen element. When the ratio of the polar functional group of the silicone macromer (according to the number of nitrogen atom) to the non-polar siloxane (according to the number of silicon atoms) is over one certain value. N-vinyl pyrrolidone and the silicone macromer containing nitrogen groups can be mutually soluble at any ratio, thereby obtaining a completely clear mixed solution.

Furthermore, when the weight ratio of N-vinyl pyrrolidone to the hydroxy-functionalized silicone-containing monomer in their mixture is in range from 0.12 to 10, the mixed solution is clear. Because of the high hydrophilicity and the high polarity of hydroxyl groups, when the molar ratio of silicon to the hydroxyl group of the hydroxy-functionalized silicone-containing monomer is higher than one certain value, N-vinyl pyrrolidone and the hydroxy-functionalized silicone-containing monomer can be mutually soluble at any ratio.

Lens Property Measurements

Measurements of Equilibrium Water Content (EWC), Oxygen Permeability and Tensile Modulus: Examples B1 to B6 and Examples C1 to C6

Silicone hydrogel contact lenses were prepared according to any one of the above embodiments and with reference to Table 2 which listed different is formulations for making silicone hydrogel lenses and lens properties including equilibrium water content (EWC), oxygen permeability and tensile modulus.following (keep the last deleted wording)

The method for measuring equilibrium water content was: measured the weight of lens after moving water on lens surface to obtain a hydrated lens weight, dried the lens in an oven and measured the weight of lens at dry state. The hydrated weight minus the dried weight gave a weight difference. The equilibrium water content (wt %)=(the weight difference/the hydrated weight)×100.

The measurement of oxygen permeability was made using a polarographic method described in ISO 9913-1 using an O2 Permeometer instrument. Measurements were taken with the sample immersed in pure water equilibrated at least 12 hours, and then the oxygen permeability was measured by O2 Permeometer Model 201T instrument (purchased from Rheder Development Company) at 35° C. in phosphate buffered saline. The oxygen permeability was record in the unit of Barrer.

Tensile modulus was measured by using a tensile testing machine, Zwick Z0.5. Lens samples were cut into 2 mm in width. The thickness of the sample was measured prior to the start of the testing using a micrometer. The speed of movement of the extension of the sample, the length of the sample and the to distance between the clamping jaws at the start of the test were maintained constant. Each sample was placed in buffered saline during the measurement. The modulus was record in the unit of MPa.

The lens formulations shown as examples B1 to B6 and C1 to C6 were described in Table 2, and the main component comprised at least one silicone macromer, 3-methacryloxy-2-hydroxypropoxy)propylbis(trimethylsiloxy)methylsilane, N-vinyl pyrrolidone (NVP) and ethylene glycol dimethacrylate (EGDMA); Table 2 lists equilibrium water content (EWC), oxygen permeability and tensile modulus of hydrogels lenses derived from formulations B1-B6 and C1-C6.

TABLE 2

| Example | Silicone hydrogel composition (unit: weight) | | | | | | Lens properties | | |
|---|---|---|---|---|---|---|---|---|---|
| | Chemical formula (3) | Chemical formula (4) | Chemical formula (5) | NVP | HEMA | EDGMA | Equilibrium water content (wt %) | Oxygen permeability (Dk) | Tensile modulus (MPa) |
| B1 | 30 | 0 | 25 | 45 | 0 | 0.9 | 44.3 | 110 | 1.01 |
| B2 | 22.5 | 0 | 27.5 | 50 | 0 | 0.9 | 51 | 63 | 0.71 |
| B3 | 22.5 | 0 | 27.5 | 45 | 5 | 0.9 | 47.2 | 86 | 0.79 |
| B4 | 27.5 | 0 | 22.5 | 50 | 0 | 0.9 | 49.5 | 74 | 0.85 |
| B5 | 27.5 | 0 | 22.5 | 45 | 5 | 0.9 | 46.9 | 95 | 0.92 |
| B6 | 12.5 | 0 | 37.5 | 50 | 0 | 0.9 | 51 | 63 | 0.71 |
| C1 | 0 | 30 | 25 | 45 | 0 | 0.9 | 45.2 | 116 | 0.95 |
| C2 | 0 | 22.5 | 27.5 | 50 | 0 | 0.9 | 50.6 | 61 | 0.66 |
| C3 | 0 | 27.5 | 22.5 | 50 | 0 | 0.9 | 48.7 | 79 | 0.84 |
| C4 | 0 | 27.5 | 22.5 | 45 | 5 | 0.9 | 46.5 | 90 | 0.71 |
| C5 | 0 | 12.5 | 37.5 | 50 | 0 | 0.9 | 52.6 | 61 | 0.63 |
| C6 | 0 | 12.5 | 37.5 | 45 | 5 | 0.9 | 50.2 | 76 | 0.68 |

According to Table 2, the equilibrium water content, oxygen permeability and tensile modulus of these silicone hydrogel lenses were in the range considered appropriate for contact lens application, and these lens properties can be further tuned by adding other hydrophilic monomers or crosslinkers.

Measurements of Contact Angle and Coefficient of Friction: Example C4 and Comparative Examples B1 to B4

Comparative Examples B1 to B4 gave lens properties of major commercial silicone hydrogel contact lenses, wherein the main component of Example B1 is Senofilcon A, and its equilibrium water content is 38 wt %. The main component of Example B2 is Comfilcon A, and its equilibrium water content is 48 wt %. The main component of Example B3 is Lotrafilcon B, and its equilibrium water content is 33 wt %. The main component of Example B4 is Balafilcon A, and its equilibrium water content is 36 wt %. Methods for measuring contact angle and coefficient of friction were described in detail in the following paragraphs.

Figure 1B:
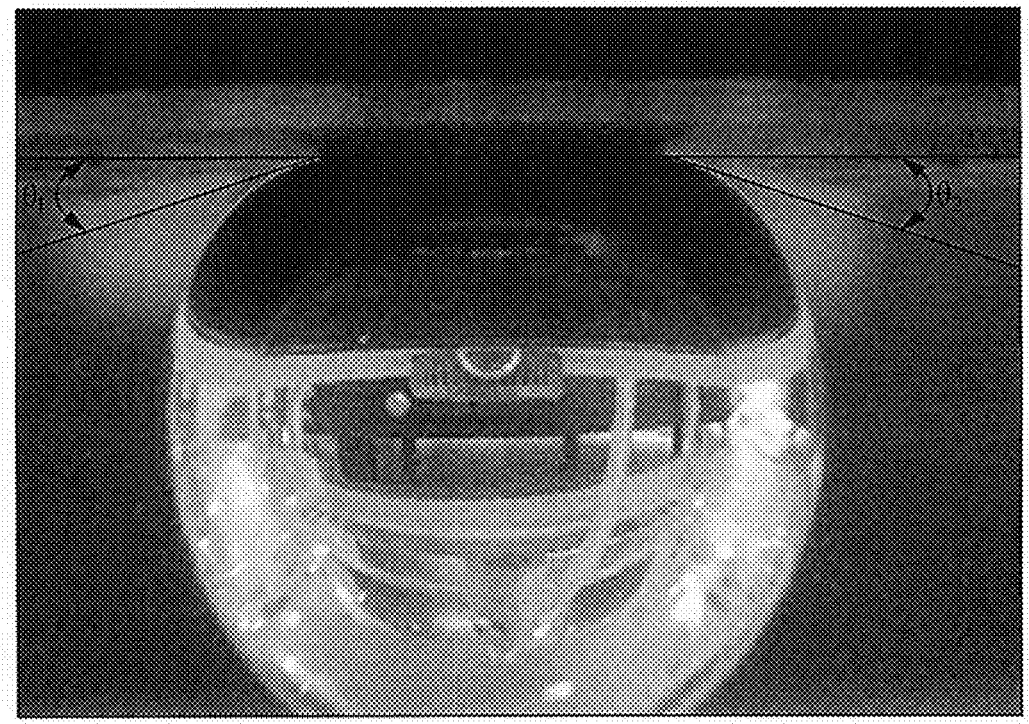
FIG. 1B is an enlarged digital image for contact angle measurement of silicone hydrogel contact lenses according to FIG. 1A.

Contact angle measurements were done using captive bubble method. According to this method, a silicone hydrogel contact lens was properly clamped between two hard plastics such that the lens center portion was made relatively flat and then the lens was submerged into a small tank filled with borate buffered saline solution. Then a bubble was properly introduced onto the lens surface and stayed on the surface. Picture was then taken with a digital camera and then the left and right contact angles were obtained from drawing using a computer program, and the average of left and right contact angle was recorded. For example, FIG. 1A gives a digital image for contact angle measurement of a silicone hydrogel contact lenses according to one embodiment of this disclosure, and FIG. 1B is an enlarged digital image for contact angle measurement of silicone hydrogel contact lenses according to FIG. 1A. As shown in FIG. 1B, the left contact angle θ1 is 11°, and the right contact angle θ2 is 12°. The method for measuring coefficient of friction is described as follows. Before measuring the lens was submerged into a small tank filled with borate buffered saline solution, and then the coefficient of friction was measured by a tribometer, using 100 μL of artificial tears as lubricant.

The conditions for measuring friction coefficient were as follows: The lens load was 3 mN/m, the sliding speed was 30 mm/min, and the substrate was polyethylene terephthalate. Each sample was repeated several times, and the average was recorded.

The results for measuring of the average contact angle and coefficient of friction were described in Table 3

TABLE 3

| | Main component | Average contact angle (°) | Coefficeint of Friction |
|---|---|---|---|
| Example C3 | Silicone hydrogel contact lens in the present invention | 11.67 | 0.006 |
| Comparative Example B1 | Senofilcon A | 26.2 | 0.004 |
| Comparative Example B2 | Comfilcon A | 31.8 | 0.003 |
| Comparative Example B3 | Lotrafilcon B | 29.1 | 0.01 |
| Comparative Example B4 | Balafilcon A | 28.5 | 0.38 |

The average contact angle of a silicone hydrogel contact lens from this present invention was in the range of 11° to 15°, and the average contact angles of other commercial contact lenses were over 25°. This suggested silicone hydrogel lenses made from compositions disclosed in this invention were more s wettable than those of commercial silicone hydrogel lenses at lest from the comparison of contact angles.

Further, lens surface lubricity is critical for lens wearing comfort. The lower the coefficient of friction the more the lubricity. So it is reasonable to claim that lens wearing comfort can be predicted by the coefficient of friction. The results to shown in Table 3 suggested that the coefficient of friction of most commercial silicone hydrogel contact lenses was in the range of 0.003 to 0.4, and the coefficient of friction of a silicone hydrogel contact lens of this invention is about 0.006, so the silicone hydrogel contact lens in the present invention is more comfortable to wear than most commercial silicone hydrogel lenses.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A silicone hydrogel composition, comprising:
   at least one silicone macromer in the amount of 5 to 50 wt % based on the total weight of the composition, wherein the silicone macromer has a structure of chemical formula (1):

$$R_1\text{-}C(=CH_2)\text{-}C(=O)\text{-}O\text{-}[CH_2]_m\text{-}X\text{-}C(=O)\text{-}Y\text{-}[CH_2]_n\text{-}[O]_p\text{-}[CH_2]_q\text{-}[Si(/\backslash)\text{-}O]_k\text{-}Si(/\backslash)\text{-}R_2 \quad (1)$$

wherein X is a secondary amino group (—NH—) or an oxygen atom; Y is a secondary amino group (—NH—) or an oxygen atom; at least one of X and Y is a secondary amino group (—NH—); $R_1$ is a hydrogen atom or a methyl group; $R_2$ is a C1-C12 alkyl group; m is an integer from 2 to 4; n is an integer from 2 to 4; p is an integer from 0 to 4; q is an integer from 2 to 4; and k is an integer which makes the number average molecular weight ($M_n$) of the silicone macromer in the range of 600 to 3000;
   a hydroxy-functionalized silicone-containing monomer in the amount of 5 to 50 wt % based on the total weight of the composition, wherein the hydroxy-functionalized silicone-containing monomer has a structure of chemical formula (2):

$$J\text{-}C(=CH_2)\text{-}C(=O)\text{-}O\text{-}CH_2\text{-}CH(OH)\text{-}CH_2\text{-}O\text{-}[CH_2]_r\text{-}Si(K_1)(K_2)(K_3) \quad (2)$$

wherein J is a hydrogen atom or a methyl group; r is an integer from 2 to 10;
   $K_1$, $K_2$ and $K_3$ are each a methyl group or a trimethylsiloxy (—OSi(CH$_3$)$_3$) in which at least one $K_1$, $K_2$ and $K_3$ is a methyl group or one trimethylsiloxy (—OSi(CH$_3$)$_3$);
   a first hydrophilic monomer in the amount of 30 to 60 wt % based on the total weight of the composition, wherein the first hydrophilic monomer is N-vinyl pyrrolidone, and the silicone macromer, the hydroxy-functionalized silicone-containing monomer or a combination thereof are mutually soluble with N-vinylpyrrolidone; and
   at least one crosslinker in the amount of less than 20 wt % based on the total weight of the composition.

2. The silicone hydrogel composition of claim 1, wherein, when X is a secondary amino group (—NH—), Y is a secondary amino group (—NH—), m is 2, p is 0, and q is 3 in the structure of chemical formula (1), and the silicone macromer has a structure of chemical formula (3):

$$(3)$$

wherein k is an integer which makes the number average molecular weight ($M_n$) of the silicone macromer in the range of 600 to 3000; and $R_2$ is a C1-C10 alkyl group.

3. The silicone hydrogel composition of claim 1, wherein X is a secondary amino group (—NH—); Y is an oxygen atom; m is 2, n is 2, q is 3 in the structure of chemical formula (1); and the silicone macromer has a structure of chemical formula (4):

$$(4)$$

wherein k is an integer which makes the number average molecular weight ($M_n$) of the silicone macromer in the range of 600 to 3000; p is an integer from 0 to 4; and $R_2$ is a C1-C10 alkyl group.

4. The silicone hydrogel composition of claim 1, wherein the molar ratio of silicon to nitrogen of the silicone macromer is in a range from 20:1 to 5:1.

5. The silicone hydrogel composition of claim 1, wherein the molar ratio of silicon to nitrogen of the silicone macromer is in a range from 10:1 to 5:1.

6. The silicone hydrogel composition of claim 1, wherein the silicone macromer contains urethane, urea or a combination thereof 7. The silicone hydrogel composition of claim 1, wherein the hydroxy-functionalized silicone-containing monomer has a molecular weight less than 500.

8. The silicone hydrogel composition of claim 1, wherein the molar ratio of silicon to the hydroxyl group of the hydroxy-functionalized silicone-containing monomer is in a range from 2:1 to 4:1.

9. The silicone hydrogel composition of claim 1, wherein, when J is a methyl group; r is 3; $K_1$ is a methyl group; $K_2$ and $K_3$ are trimethylsiloxy in the structure of chemical formula (2); the hydroxy-functionalized silicone-containing monomer is (3-methacryloxy-2-hydroxypropoxy) propylbis (trimethylsiloxy) methylsilane; and the hydroxy-functionalized silicone-containing monomer has a structure of chemical formula (5):

$$(5)$$

10. The silicone hydrogel composition of claim 1, wherein the crosslinker is selected from the group consisting of ethylene glycol di(meth)acrylate, triethylene glycol di(meth)acrylate, tetramethylene glycol di(meth)acrylae, trimethylolpropane tri(meth)acrylate, pentaerythritol tetra(meth)acrylate, bisphenol A di(meth)acrylate, methylenebis(meth)acrylamide, divinyl ether, divinyl sulfone, divinylbenzene, trivinylbenzene, triallyl isocyanurate, triallyl phthalate and diallyl phthalate, allyl methacrylate, and a combination thereof.

11. The silicone hydrogel composition of claim 1, further comprising at least one second hydrophilic monomer in the amount less than 20 wt % based on the total weight of the composition, wherein the second hydrophilic monomer is selected from the group consisting of 2-hydroxyethyl methacrylate, glycerol methacrylate, 2-hydroxy-butyl methacrylate, acrylic acid, methacrylic acid, N,N-dimethylacrylamide, N,N-dimethyl methacrylamide, N-vinyl,N-methyl acetamide, 2-methacryloyloxyethyl phosphorylcholine, and a combination thereof.

12. The silicone hydrogel composition of claim 1, further comprising at least one tint monomer or one tint compound.

13. The silicone hydrogel composition of claim 1, further comprising at least one UV-blocking monomer, and the UV-blocking monomer is a benzotrizole-type monomer.

14. The silicone hydrogel composition of claim 1, further comprising at least one organic solvent, wherein the organic solvent is selected from the group consisting of n-butanol, t-butanol, n-pentyl alcohol, t-amyl alcohol, n-hexanol, n-octanol, n-nonanol, n-decanol, 3-methoxy-1-butanol, methyl cabitol, ethyl carbitol, propyl carbitol, butyl carbitol and a combination thereof.

15. The silicone hydrogel composition of claim 1, wherein the total amount of the silicone macromer and the hydroxy-functionalized silicone-containing monomer is in the range of 40 to 70 wt % based on the total weight of the composition.

16. The silicone hydrogel composition of claim 1, wherein the silicone macromer is in the amount of 10 to 30 wt % based on the total weight of the composition, the hydroxy-functionalized silicone-containing monomer is in the amount of 10 to 30 wt % based on the total weight of the composition, and the N-vinyl pyrrolidone is in the amount of 30 to 50 wt % based on the total weight of the composition.

17. The silicone hydrogel composition of claim 1, wherein the silicone hydrogel composition is comprised in a silicone hydrogel contact lens.

18. The silicone hydrogel composition of claim 1, wherein the silicone macromer is in the amount of 15 to 30 wt % based on the total weight of the composition, and k of chemical formula (1) is an integer which makes the number average molecular weight ($M_n$) of the silicone macromer in the range of 800 to 1500;

the hydroxy-functionalized silicone-containing monomer is in the amount of 15 to 30 wt % based on the total weight of the composition, and the hydroxy-functionalized silicone-containing monomer has a structure of chemical formula (5):

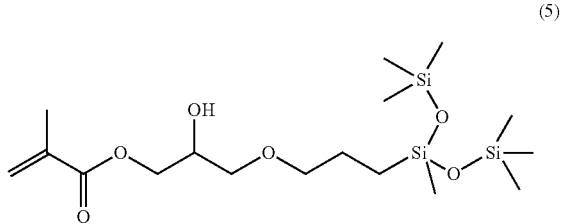 [SMILES: C=C(C)C(=O)OCC(O)COCCC[Si](C)(O[Si](C)(C)C)O[Si](C)(C)C]

(5)

the first hydrophilic monomer is in the amount of 30 to 50 wt % based on the total weight of the composition; and
the crosslinker is in the amount of less than 5 wt % based on the total weight of the composition.

* * * * *